Aug. 21, 1945.  R. M. REED  2,383,416
PROCESS OF REMOVING HYDROGEN SULPHIDE FROM HYDROCARBON LIQUIDS
Filed March 12, 1943
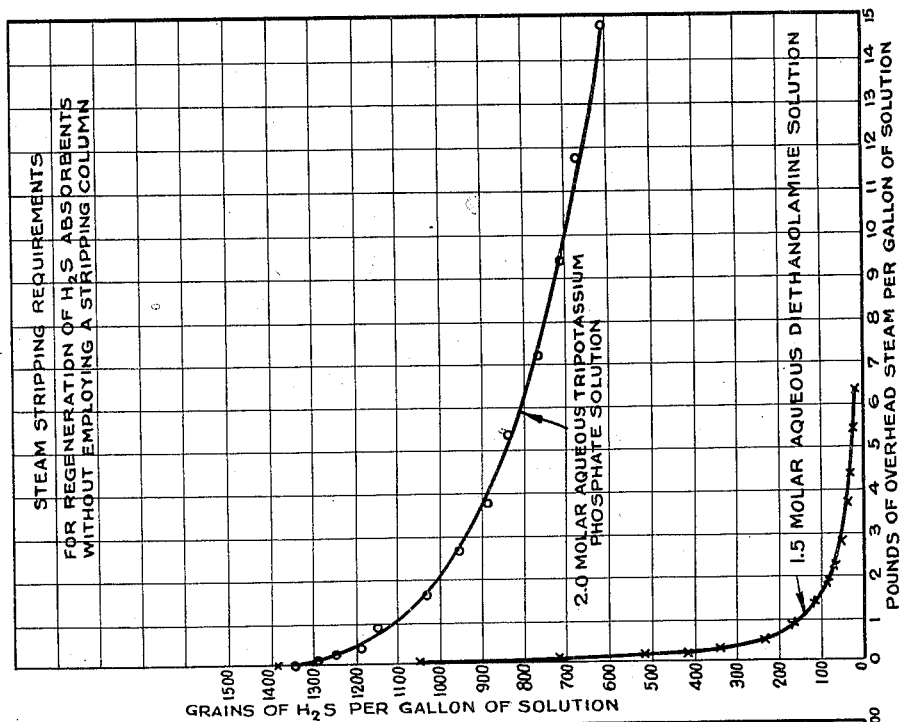
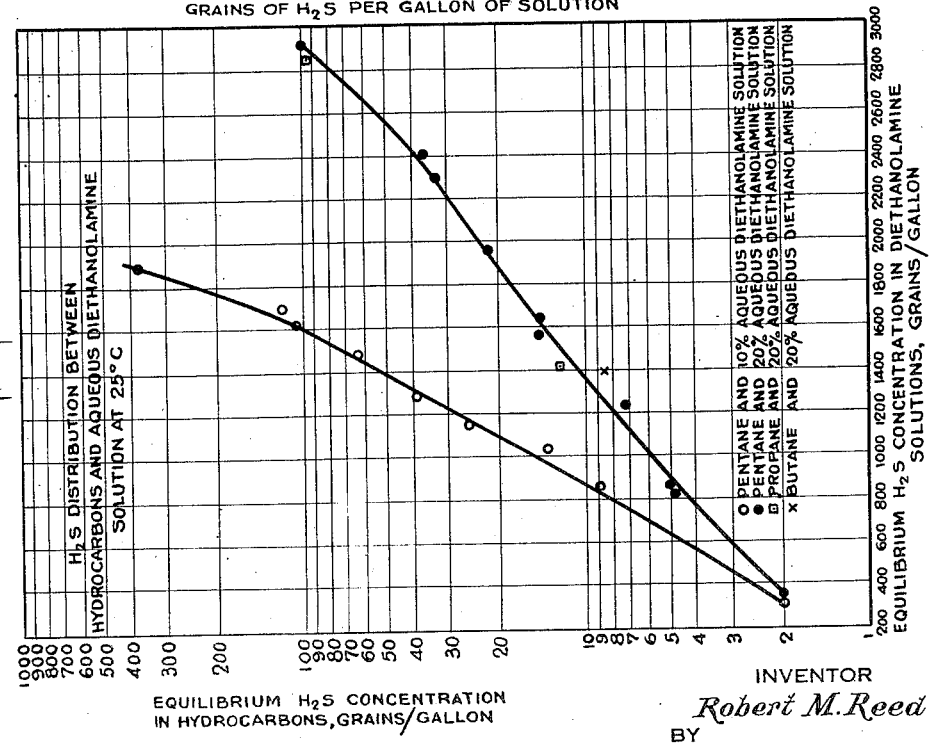
INVENTOR
Robert M. Reed
BY
ATTORNEYS Patented Aug. 21, 1945

2,383,416

UNITED STATES PATENT OFFICE 2,383,416

PROCESS OF REMOVING HYDROGEN SULPHIDE FROM HYDROCARBON LIQUIDS

Robert M. Reed, Louisville, Ky., assignor to The Girdler Corporation, Louisville, Ky., a corporation of Delaware Application March 12, 1943, Serial No. 478,860

3 Claims. (Cl. 196—32)

This invention relates to the treatment of hydrocarbon liquids to remove certain undesirable sulphur compounds therefrom. Although it is useful for the treatment of high boiling hydrocarbons and crude petroleum, it is of particular value in the purification of propane, butane, gasoline and other low-boiling fractions or distillates and mixtures thereof.

Hydrocarbon liquids of the type referred to above contain sulphur compounds such as hydrogen sulphide ($H_2S$), carbon bisulphide ($CS_2$), carbonyl sulphide (COS), and various mercaptans (RSH, in which R represents an alkyl radical), and they may also contain aldehydes, and acidic constituents other than those mentioned above. Such compounds are harmful to the quality of hydrocarbon liquids, and it is desirable that they be removed during the purification and refining of the liquid. This is particularly true of hydrogen sulphide, which, because of its boiling point, associates itself with the lighter petroleum fractions during the refining operations.

Many processes have been proposed for separating hydrogen sulphide from the lighter liquid hydrocarbons, propane, butane, etc. Aqueous and alcoholic solutions of alkali metal and alkaline earth hydroxides have been employed successfully, but such solutions possess the disadvantage that they ordinarily cannot be regenerated for further use. Weaker alkali solutions, such as those containing sodium carbonate, potassium phosphate and alkali metal salts of organic acids have also been employed for this purpose. These solutions can be regenerated for further use but are all definitely limited in usefulness and effectiveness, either because they are not sufficiently reactive, or because it is too difficult to regenerate them.

Bottoms, in U. S. Reissue Patent 18,958, taught that amines having certain defined structural characteristics are of value in the absorption and removal of acidic gases, such as carbon dioxide and hydrogen sulphide, from gaseous mixtures, for instance, those composed essentially of hydrocarbon gases. One advantage of the Bottoms process arises from the fact that the amines employed in liquid form, for instance in aqueous solution, can be regenerated by the simple step of heating, and the acidic gases thus liberated from the compounds which they have formed with the amines, can be recovered in a substantially pure state.

That process has gone into very extensive commercial use for the treatment of gaseous mixtures, but Bottoms did not give any information as to the behavior of amine solutions with hydrocarbon liquids. Various attempts have been made to utilize the same type of reaction for the removal of hydrogen sulphide from liquid hydrocarbons, but so far as I am advised, amines have never proved satisfactory and have not been used commercially in a continuous cyclic process for the separation of hydrogen sulphide or other sulphur compounds from hydrocarbon liquids, prior to the present invention or discovery.

Rosenstein, in U. S. Patent 2,110,403, states:

"methods using organic bases or solutions thereof to separate hydrogen sulfide are objectionable when the liquids from which $H_2S$ is separated contain or consist of hydrocarbons." (p. 1, 1st col., lines 38-41)

He further states that:

"most of such organic bases are appreciably soluble in the hydrocarbon mixture being treated and necessitate further treatment of the latter to purify the mixture and to recover the bases." (p. 1, line 49, 1st col. to line 3, 2nd col.)

Wood, in U. S. Patent 2,220,138, recognizes the solubility in hydrocarbon liquids of the amines he tried, and states that amine solutions of about 50% concentration "are not practical for removing sulfur compounds from liquid hydrocarbons." (p. 1, 2nd col., lines 6 and 7)

He recommends that the concentration of the amine in the aqueous solutions be below 30%.

Wilson and Fife, in U. S. Patent 2,238,201, describe a process of purifying hydrocarbon liquids by the use of polyalkylene polyamines. They recognized the desirability of employing amines having low solubilities in hydrocarbons, but the reagents they employed showed appreciable solubility in hydrocarbons even from the extremely dilute aqueous solutions used in the examples they cited.

Many amines cannot be used satisfactorily for treating hydrocarbon liquids because they unite chemically with carbonyl sulphide, carbon bisulphide and aldehydes, forming stable, neutral nitrogen compounds which have no capacity for hydrogen sulphide. This applies to primary amines as a class and to all of the aliphatic polyalkylene amines disclosed and claimed by Wilson and Fife, which contain one or more primary amino groups. The following are examples of the reaction which takes place with primary and secondary amines as a class, and carbonyl sulphide:

4 HOCH₂CH₂NH₂ + COS ⟶

2-amino-ethanol    Carbonyl sulphide (HOCH₂CH₂NH)₂CO + (HOCH₂CH₂NH₂)₂S

Sym-diethanol urea    2-aminoethanol sulphide

2 HOCH(CH₃NHCH₃)₂ + COS ⟶

Bis(methylamino)    Carbonyl sulphide

HOCH=(CH₂NCH₃)₂=CO + HOCH(CH₂NH₂CH₃)₂S

Bis(methylamino) isopropanol urea    Bis(methylamino) isopropanol sulphide

Such substituted ureas cannot be broken down by simple heating in the regenerating step to liberate the amine, and thus the amine solution becomes progressively contaminated with the substituted urea, and progressively loses effective strength as the amine enters into permanent union with the carbonyl sulphide. The substituted ureas are non-alkaline compounds, and have no capacity to absorb hydrogen sulphide.

In addition to the objection to the use of amines in general for removing hydrogen sulphide from hydrocarbon liquids due to their formation of stable compounds with carbonyl sulphide, etc., they are objectionable because of their solubility in hydrocarbons, as above pointed out by Rosenstein, and which I have verified in numerous cases.

The solubility of the primary amines in hydrocarbon liquids varies not with structure but in an unpredictable manner, and while some of the primary amines show relatively low solubility in hydrocarbon liquids, the class is eliminated from consideration because of the undesirable side reactions just mentioned.

Aqueous solutions of many of the secondary amines have high capacity for hydrogen sulphide and react rapidly with hydrogen sulphide, and many of them are easily regenerated and are comparatively non-volatile, but the solubility of these amines in hydrocarbon liquids is also unpredictable and in some cases is very high, as is illustrated by the following table showing the solubility of certain representative amines in gasoline in parts per million by weight when the gasoline is in equilibrium with an aqueous solution of the amine containing 40% amine by weight:

| Amine | Solubility in gasoline, P. P. M. |
|---|---|
| Bis(methylamino)isopropanol | 650 |
| Morpholine | 4,870 |

Tertiary amines, although they are unreactive with carbonyl sulphide, carbon bisulphide and aldehydes, are relatively unreactive with hydrogen sulphide as compared to primary and secondary amines. The poor capacity for hydrogen sulphide is due either to the fact that the tertiary amines are more weakly basic, or to the fact that they do not contain replaceable hydrogen atoms attached to the nitrogen atom. The tertiary amines are also of greater equivalent weight and will consequently absorb less hydrogen sulphide per pound of amine. The solubilities of the tertiary amines in hydrocarbon liquids vary in an unexplained manner, but the solubilities are usually greater than those of the corresponding secondary amines. Typical examples, in the same units as above, are as follows:

| Amine | Solubility in gasoline, P. P. M. |
|---|---|
| Methyl diethanolamine | 127 |
| Bis(dimethylamino)isopropanol | 24,000 |
| Diethylaminoethanol | 40,900 |

Calculations from Wilson and Fife's data show that the solubility of triethanolamine in gasoline which is in equilibrium with a water solution containing 5% of triethanolamine is 50 parts per million. The solubility of triethanolamine from a 40% aqueous solution would be many times greater.

The conclusions I have drawn from the above data are that the aqueous solutions of the amines as a class, primary, secondary and tertiary, are unsuitable for use in the purification of hydrocarbon liquids.

However, I have discovered quite unexpectedly that diethanolamine [HN(CH₂CH₂OH)₂] does have all of the required and desirable properties for use in the purification of hydrocarbon liquids. Among the advantages of diethanolamine is that it does not behave as do many other secondary amines in regard to forming stable compounds with sulphur compounds in liquid hydrocarbons. Repeated tests, over long periods of time, have shown that diethanolamine in aqueous solutions is inert toward carbonyl sulphide and that there is no appreciable reaction with carbon bisulphide or aldehydes. I am unable to explain the abnormal behavior of diethanolamine in this manner because many other amines containing imino radicals react rapidly with the compounds mentioned. Possibly the two hydroxyl radicals in diethanolamine exert a polar influence or cause steric hindrance which prevents the imino radical from undergoing the above mentioned reactions.

Diethanolamine also possesses many other advantages over the compounds used or suggested in previously known processes for purification of hydrocarbon liquids. Diethanolamine is highly reactive toward, and has high capacity for, hydrogen sulphide, and the distribution ratio of hydrogen sulphide between the aqueous diethanolamine solution and the hydrocarbon liquid is markedly in the direction of the aqueous solution, as illustrated in Fig. I. Moreover, the solubility of diethanolamine in liquid hydrocarbons is extremely low. When an aqueous solution containing 40% of diethanolamine is in equilibrium with gasoline, the solubility of diethanolamine in the gasoline is only 10.9 parts per million, which is negligible as compared with the solubilities of other amines such as those mentioned in the tables appearing hereinbefore. I have found in actual operation that the rate of reaction between hydrogen sulphide and diethanolamine is considerably more rapid than the rate at which diethanolamine dissolves in liquid hydrocarbons, so that complete hydrogen sulphide removal from such hydrocarbon can be accomplished before the hydrocarbon becomes saturated with the diethanolamine. Thus, by proper operation of my herein described process, the loss of diethanolamine into the hydrocarbon liquid can be kept even below the theoretical loss calculated from the equilibrium solubility of diethanolamine in the hydrocarbon. Also, contrary to previous teachings and expectations, solutions containing 50% or more of diethanolamine by weight may be readily used. It is preferable, however, not to exceed a concentration of about 80%, since above that point mechanical difficulties may be encountered due to viscosity, and the increase in solubility and decrease in chemical activity above the 80% concentration may render the process commercially uneconomical.

Another marked advantage of diethanolamine over absorbents previously used for purifying hydrocarbon liquids is its greater ease of regeneration on boiling and with no appreciable loss or contamination by products of side reactions. Comparison of the relative steam requirements for separating hydrogen sulphide from solutions of diethanolamine and tripotassium phosphate is shown in Figure II. These solutions were stripped with steam under identical conditions and the degree of hydrogen sulphide removal obtained was measured in each case.

As compared with its reactivity toward hydrogen sulphide, diethanolamine in aqueous solution is only mildly reactive toward mercaptans, but it does accomplish partial removal of mercaptans from hydrocarbon liquids. The mercaptans which are absorbed by the amine solution are readily separated from the solution along with the hydrogen sulphide during regeneration, and so cause no difficulties. The complete hydrogen sulphide removal obtainable with aqueous solutions of diethanolamine expedites the complete removal of mercaptans from hydrocarbon liquids by known regenerative processes in which the presence of hydrogen sulphide interferes.

Johnstone and Benedict, in U. S. Patent 2,281,356, have suggested employment of a solution of diethanolamine in ethylene glycol for separating water and hydrogen sulphide from gasoline prior to copper sweetening. Although their process may be capable of effecting some reduction in the hydrogen sulphide content of hydrocarbon liquids, it is incapable of effecting complete hydrogen sulphide removal. I have found that an aqueous solution of diethanolamine is surprisingly more effective for removing hydrogen sulphide from hydrocarbon liquids than a solution of diethanolamine in a non-aqueous solvent such as ethylene glycol. This difference in effectiveness is shown in the following table giving equilibrium hydrogen sulphide contents of 20% solutions of diethanolamine in water and ethylene glycol in contact with pentane at 25° C.:

| $H_2S$ content of pentane, grains per gallon | $H_2S$ content of aqueous diethanolamine solution, grains per gallon | $H_2S$ content of 20% solution of diethanolamine in ethylene glycol, grains per gallon |
|---|---|---|
| 2 | 340 | 50 |
| 3 | 560 | 240 |
| 10 | 1,380 | 830 |
| 15 | 1,700 | 1,030 |

Presumably this difference in behavior of the diethanolamine in water and in ethylene glycol occurs as the result of the hydration of the diethanolamine in water:

$$HN(CH_2CH_2OH)_2 + H_2O \longrightarrow HOH_2N(CH_2CH_2OH)_2$$

The diethanolamine hydrate is a stronger base than diethanolamine, so that aqueous solutions of diethanolamine are markedly more effective for absorbing hydrogen sulphide than solutions of diethanolamine in non-aqueous solvents.

Having thus described my invention, what I claim as new and desire to secure by Letters Patent is:

1. The process of removing hydrogen sulphide from hydrocarbon liquids containing both hydrogen sulphide and carbonyl sulphide, which comprises the steps of contacting the hydrocarbon liquid with an aqueous solution of diethanolamine while dissolving but little of said diethanolamine in said hydrocarbon, separating said solution and the contained hydrogen sulphide from the hydrocarbon liquid, heating said solution to dispel the absorbed hydrogen sulphide therefrom and regenerate said solution, cooling said solution and contacting further quantities of hydrocarbon liquid with the regenerated solution.

2. In the purification of low boiling hydrocarbon distillates containing carbonyl sulphide and hydrogen sulphide, the improvement which comprises treating the distillates with an aqueous solution of diethanolamine to remove hydrogen sulphide but not the carbonyl sulphide.

3. The improvement as defined in claim 2, further characterized in that said aqueous solution contains not more than 80% of said diethanolamine by weight.

ROBERT M. REED.